(12) United States Patent
Vogel

(10) Patent No.: US 12,628,807 B2
(45) Date of Patent: May 19, 2026

(54) JAWS ASSEMBLY FOR A FLY TYING VISE

(71) Applicant: Wolff Industries, Inc., Spartanburg, SC (US)

(72) Inventor: David Vogel, Spartanburg, SC (US)

(73) Assignee: Wolff Industries, Inc., Spartanburg, SC (US)

( * ) Notice: Subject to any disclaimer, the term of this patent is extended or adjusted under 35 U.S.C. 154(b) by 276 days.

(21) Appl. No.: 18/219,868

(22) Filed: Jul. 10, 2023

(65) Prior Publication Data

US 2025/0017190 A1    Jan. 16, 2025

(51) Int. Cl.
A01K 97/28        (2006.01)
B25B 5/06         (2006.01)

(52) U.S. Cl.
CPC ............... A01K 97/28 (2013.01); B25B 5/06 (2013.01)

(58) Field of Classification Search
CPC .................................. B25B 5/06; A01K 97/28
See application file for complete search history.

(56) References Cited

U.S. PATENT DOCUMENTS

| | | | | |
|---|---|---|---|---|
| 2,586,636 | A * | 2/1952 | Fischer | A01K 97/28 269/254 R |
| 4,134,577 | A * | 1/1979 | Price | B25B 5/10 269/71 |

| | | | | |
|---|---|---|---|---|
| 4,214,739 | A * | 7/1980 | Dailey | B25B 1/22 269/75 |
| 4,322,065 | A * | 3/1982 | Doiron | B25B 5/08 269/254 R |
| 5,165,673 | A | 11/1992 | Newton, Jr. | |
| 5,169,079 | A * | 12/1992 | Renzetti | A01K 97/28 242/448 |
| 5,230,177 | A | 7/1993 | Hanley | |
| 5,716,020 | A | 2/1998 | Shults | |
| 5,809,686 | A * | 9/1998 | Abby | A01K 97/28 269/69 |
| 5,826,867 | A | 10/1998 | Roby | |
| 5,971,225 | A * | 10/1999 | Kapsa | B65B 7/14 215/311 |
| 6,119,972 | A | 9/2000 | Vogel et al. | |
| 6,126,157 | A * | 10/2000 | Rutzer | B25B 5/109 269/254 R |
| 6,364,304 | B1 | 4/2002 | Strait et al. | |
| 7,232,119 | B2 * | 6/2007 | Yonenoi | A01K 97/28 269/907 |

(Continued)

*Primary Examiner* — Seahee Hong
(74) *Attorney, Agent, or Firm* — Dority & Manning, P.A.

(57) ABSTRACT

A jaws assembly for a fly tying vise is provided. The jaws assembly includes a first jaw member and a second jaw member that each extend from a base to a tip. The first jaw member and the second jaw member are at least partially spaced apart from one another such that a gap is defined between the tip of the first jaw member and the tip of the second jaw member. The jaws assembly further includes a first fastener that couples the first jaw member to the second jaw member. The jaws assembly further includes a second fastener that extends between the first jaw member and the second jaw member at the base of the first jaw member and the second jaw member. The second fastener is removably contactable with the first jaw member and the second jaw member to adjust a width of the gap.

19 Claims, 7 Drawing Sheets

(56)                   References Cited

U.S. PATENT DOCUMENTS

| 7,566,022 | B1 * | 7/2009 | McKinley | ............. | A01K 97/28 |
| | | | | | 269/221 |
| 7,950,638 | B2 | 5/2011 | Su | | |
| 8,016,279 | B1 * | 9/2011 | Su | ............................ | B25B 5/08 |
| | | | | | 269/157 |
| 9,737,064 | B2 | 8/2017 | Durrant | | |
| 10,888,080 | B2 | 1/2021 | Yurecko | | |
| 2018/0117738 | A1 | 5/2018 | Klumper | | |

* cited by examiner

600

POSITION AN ARTICLE IN A GAP DEFINED BETWEEN A FIRST JAW MEMBER
AND A SECOND JAW MEMBER — 602

ROTATE A FIRST FASTENER TO ADJUST A WIDTH OF
THE GAP A FIRST AMOUNT — 604

ROTATE A SECOND FASTENER TO ADJUST THE WIDTH OF
THE GAP A SECOND AMOUNT — 606

CLAMP THE ARTICLE BETWEEN THE FIRST JAW MEMBER
AND THE SECOND JAW MEMBER — 608

JAWS ASSEMBLY FOR A FLY TYING VISE

FIELD

The present disclosure relates generally to fishing a fly tying vise for tying fishing flies. More particularly, the disclosure is related to a jaws assembly for a fly tying vise.

BACKGROUND

Fishermen have long used artificial flies as fishing lures in fly casting. Such artificial flies are typically made by hand tying hairs, feathers, and other materials to a fishhook to simulate a real insect. In order to free up both hands for holding and tying the hair and feathers, fishing enthusiasts often employ a vise to hold the fishhook in the desired position. There are many different designs of fly tying vises available. In general, the vises employ adjustable hook-holding jaws that are tightened to clamp onto the fishhook.

One difficulty with fly tying devices is designing a jaw arrangement that is easily adjustable so that it can fixedly hold fishhooks of varying sizes. Many jaw arrangements employ levers having a cam to open and close the jaws. While such adjustment mechanisms work fairly well, they can be cumbersome to use. It can also be somewhat difficult with these mechanisms to determine the right amount of jaw tension needed to securely hold the fishhook without crushing or damaging the hook. Another difficulty in designing fly tying vises is ensuring that the jaws always remain parallel to each other with no misalignment to enable a wide range of fishhook sizes to be held securely there between with no slippage and without crushing the smallest fishhooks.

Accordingly, a fly tying vise having a jaw assembly, that addresses these and other difficulties with prior art fly tying devices, is desired and would be appreciated in the art.

BRIEF DESCRIPTION

Aspects and advantages of the assemblies/systems/methods in accordance with the present disclosure will be set forth in part in the following description, or may be obvious from the description, or may be learned through practice of the technology.

In accordance with one embodiment, a jaws assembly for a fly tying vise is provided. The jaws assembly includes a first jaw member and a second jaw member that each extend from a base to a tip. The first jaw member and the second jaw member are at least partially spaced apart from one another such that a gap is defined between the tip of the first jaw member and the tip of the second jaw member. The jaws assembly further includes a first fastener that couples the first jaw member to the second jaw member. The jaws assembly further includes a second fastener that extends between the first jaw member and the second jaw member at the base of the first jaw member and the second jaw member. The second fastener is removably contactable with the first jaw member and the second jaw member to adjust a width of the gap.

In accordance with another embodiment, A fly tying vise is provided. The fly tying vise includes a base, a housing, and a stem extending from the base to the housing. The fly tying vise further includes a shaft mounting flange that is coupled to the shaft and a jaws assembly that is coupled to the shaft mounting flange. The jaws assembly includes a first jaw member and a second jaw member that each extend from a base to a tip. The first jaw member and the second jaw member are at least partially spaced apart from one another such that a gap is defined between the tip of the first jaw member and the tip of the second jaw member. The jaws assembly further includes a first fastener that couples the first jaw member to the second jaw member. The jaws assembly further includes a second fastener that extends between the first jaw member and the second jaw member at the base of the first jaw member and the second jaw member. The second fastener is removably contactable with the first jaw member and the second jaw member to adjust a width of the gap.

In accordance with yet another embodiment, a method of operating a jaws assembly is provided. The jaws assembly includes a first jaw member and a second jaw member that each extend from a base to a tip. The first jaw member and the second jaw member are at least partially spaced apart from one another such that a gap is defined between the tip of the first jaw member and the tip of the second jaw member. The method includes rotating a first fastener to adjust a width of the gap a first amount. The first fastener couples the first jaw member to the second jaw member. The method further includes rotating a second fastener to adjust the width of the gap a second amount.

These and other features, aspects and advantages of the present assemblies/systems/methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present assemblies/systems/methods, including the best mode of making and using the present systems and methods, directed to one of ordinary skill in the art, is set forth in the specification, which makes reference to the appended figures, in which.

DETAILED DESCRIPTION

Figure 1:
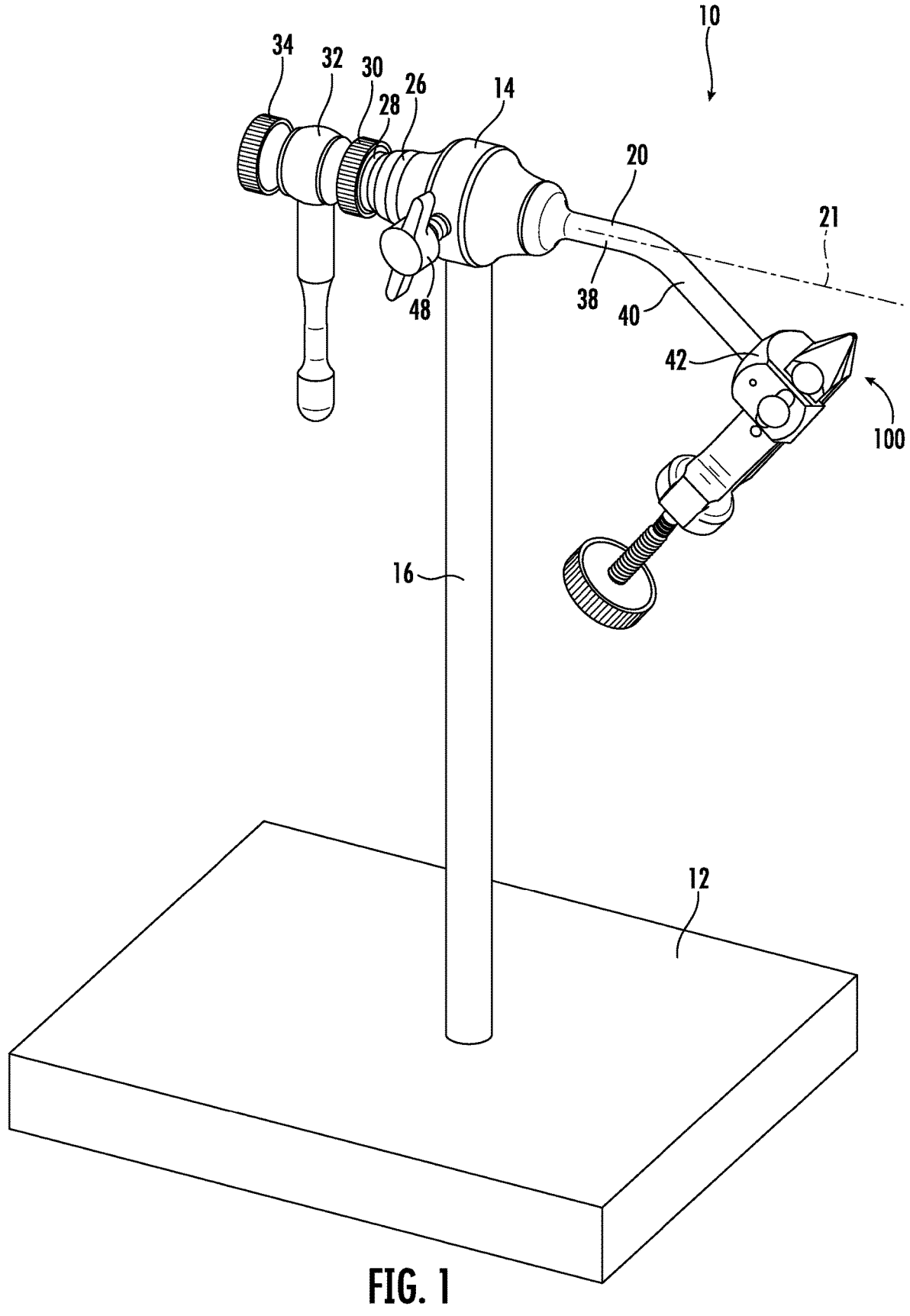
FIG. 1 illustrates a perspective view of a fly tying vise in accordance with embodiments of the present disclosure.

Reference now will be made in detail to embodiments of the present assemblies/systems/methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
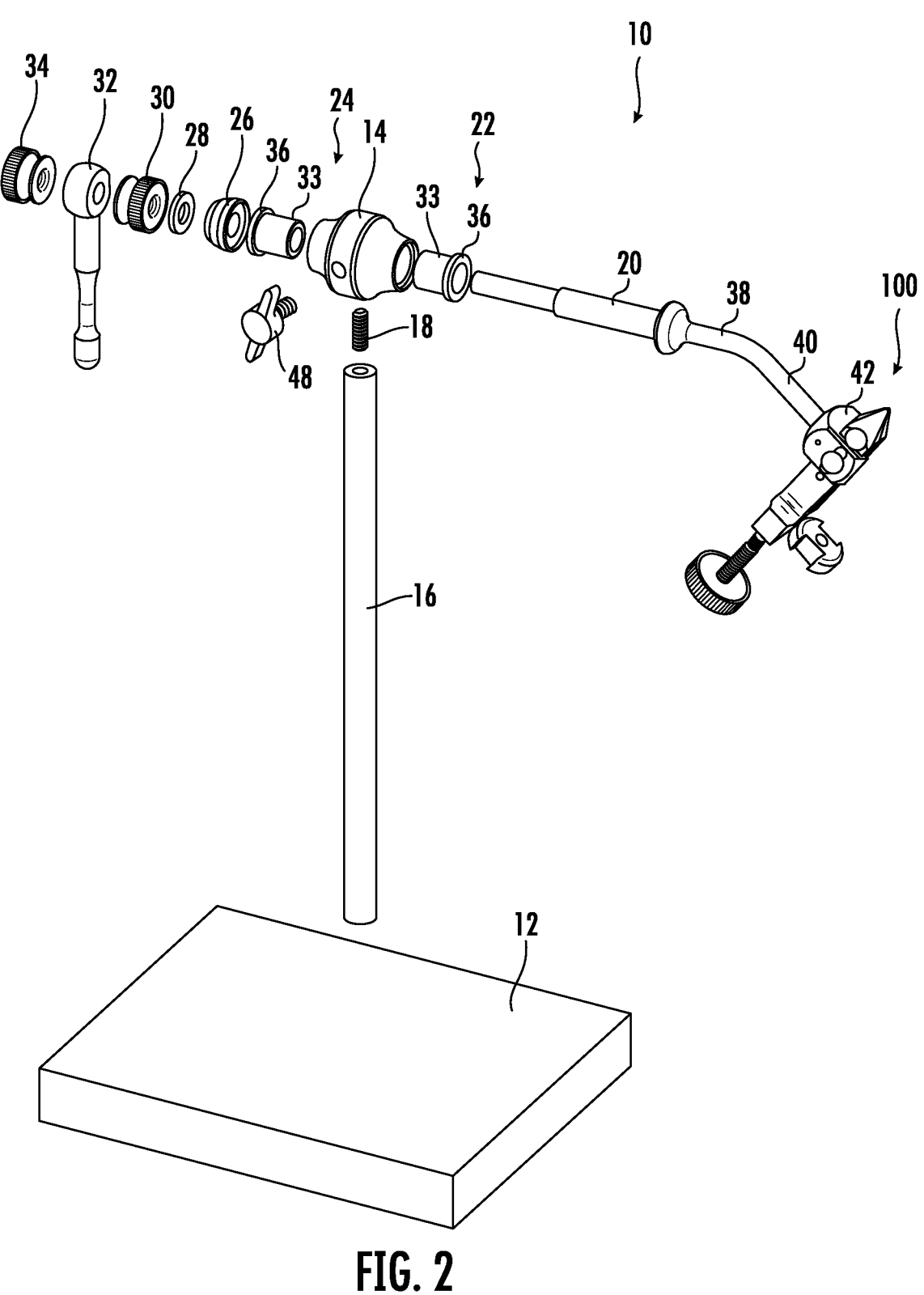
FIG. 2 illustrates an exploded view of a fly tying vise in accordance with embodiments of the present disclosure.

Referring now to the drawings, FIG. 1 illustrates a perspective view of a fly tying vise 10, and FIG. 2 illustrates an exploded view of the fly tying vise 10, in accordance with embodiments of the present disclosure. As shown, the fly tying vise 10 may include a base 12, a housing 14, and a stem 16. The base 12 may have a generally flat or planar bottom surface for ensuring the fly tying vise 10 is able to rest in a stable manner on a surface or the ground. The stem 16 may extend between, and couple to, the base 12 and the housing 14. That is, the stem 16 may extend from the base 12 to the housing 14. For example, the stem 16 may be a cylindrical body that threadably couples to the base 12 at a first end and threadably couples to the housing 14 at a second end. For example, a connection screw 18 may threadably couple the stem 16 to the housing 14.

The housing 14 may be stationary but may surround one or more rotary components of the fly tying vise 10. In exemplary embodiments, the fly tying vise 10 may include a shaft 20 that extends through the housing 14. A first bushing 22, a second bushing 24, a spacer 26, a washer 28, a first thumb nut 30, a finger pin 32, and a second thumb nut 34 may each be coupled to, and rotate with, the shaft 20. That is, each of the first bushing 22, the second bushing 24, the spacer 26, the washer 28, the first thumb nut 30, the finger pin 32, and the second thumb nut 34 may surround, and couple to (e.g., via a threaded connection or friction fit), the shaft 20.

The first bushing 22 and the second bushing 24 may each include a main body 33 and a flange 36 extending from the main body 33. The main body 33 may be disposed within the housing 14, and the flange 36 may be disposed outside of the housing 14 but in contact therewith. Specifically, the flange 36 of the second bushing 24 may be disposed between, and in contact with, the housing 14 and the spacer 26. The spacer 26 may be disposed between, and in contact with, the first thumb nut 30 and the flange 36 of the second bushing 24. The first thumb nut 30 may be threadably coupled to the shaft 20, such that rotation of the first thumb nut 30 adjusts the amount of pressure applied to the spacer 26 and the flange 36 of the second bushing 24, thereby impacting the amount of friction between the flange 36 of the second bushing 24 and the housing 14 when the shaft 20 rotates. This impacts the resistance felt by the user when pushing on the finger pin 32 to rotate the shaft 20. As such, the user may rotate the first thumb nut 30 to adjust the resistance felt when pushing on the finger pin 32 as desired.

The shaft 20 of the fly tying vise 10 may rotate about a centerline axis 21, e.g., by having a user apply a force to the finger pin 32. The shaft 20 may include an axial portion 38 and a diverging portion 40. The axial portion 38 may extend along the centerline axis 21, and the diverging portion 40 may diverge away from the centerline axis 21. In exemplary embodiments, the fly tying vise 10 may further include a shaft mounting flange 42 coupled to the shaft 20. Particularly, the shaft mounting flange 42 may be coupled to a terminal end of the diverging portion 40 of the shaft 20.

In exemplary embodiments, a jaws assembly 100 may be coupled to the shaft mounting flange 42. The jaws assembly 100 may include a first jaw member 102 and a second jaw member 104, which may be adjusted to clamp or pinch onto a fishhook. The fishhook may be coupled to the jaws assembly 100 and oriented such that the shank of the fishhook is oriented along the centerline axis 21. In this way, when the shaft 20 is rotated, the shank of the fishhook rotates along the centerline axis 21, thereby allowing the user to fasten feathers, hair, etc. to the fishhook to create a fly.

In many embodiments, the fly tying vise 10 may further include a shaft locking screw 48, which may threadably couple to the housing 14 and may removably contact the shaft 20. For example, the shaft locking screw 48 may be tightened into contact with the shaft 20, thereby preventing rotation of the shaft 20 when desired. Alternatively, the shaft locking screw 48 may be loosened out of contact with the shaft 20, thereby allowing for rotation of the shaft 20.

Figure 3:
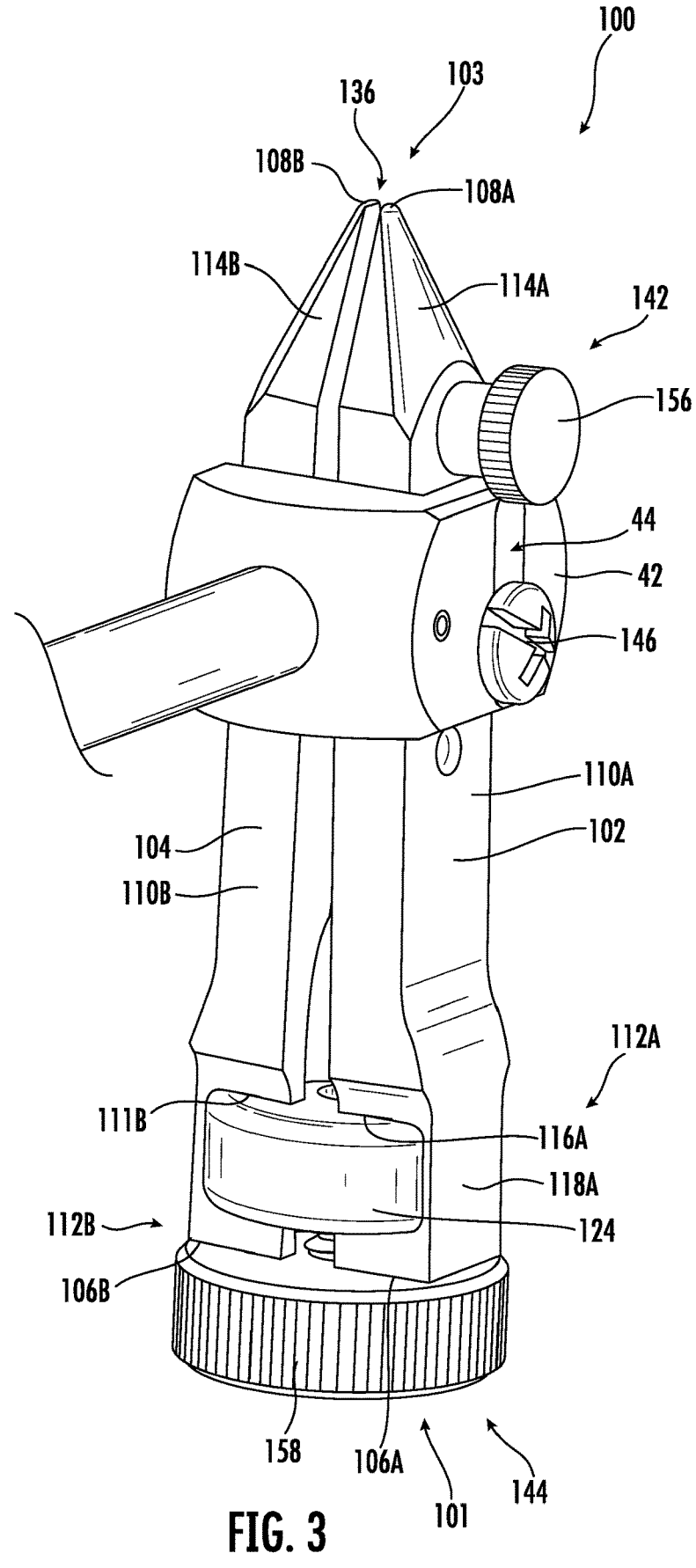
FIG. 3 illustrates a jaws assembly of a fly tying vise in accordance with embodiments of the present disclosure.
Figure 4:
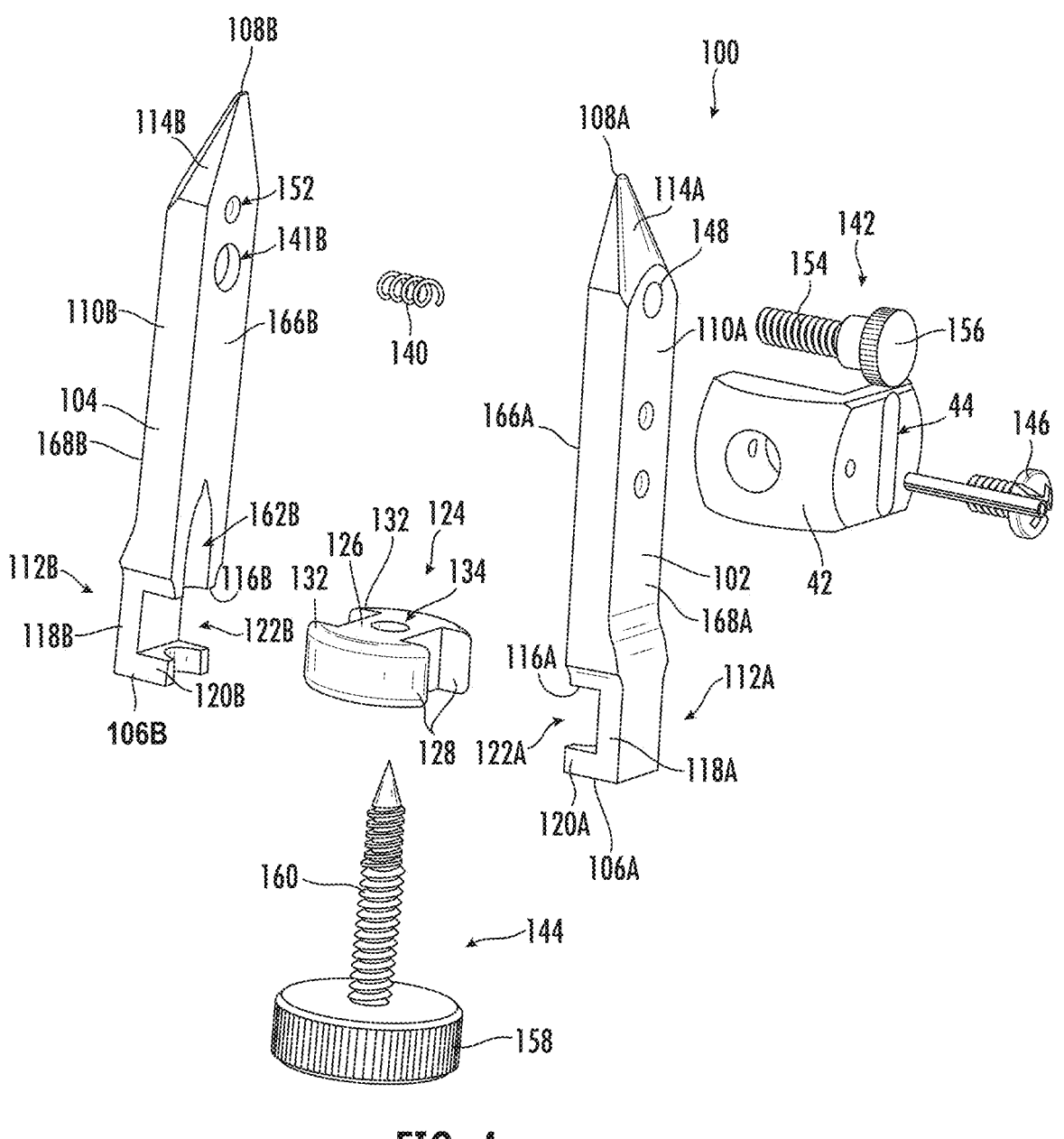
FIG. 4 illustrates an exploded view of a jaws assembly in accordance with embodiments of the present disclosure.
Figure 5:
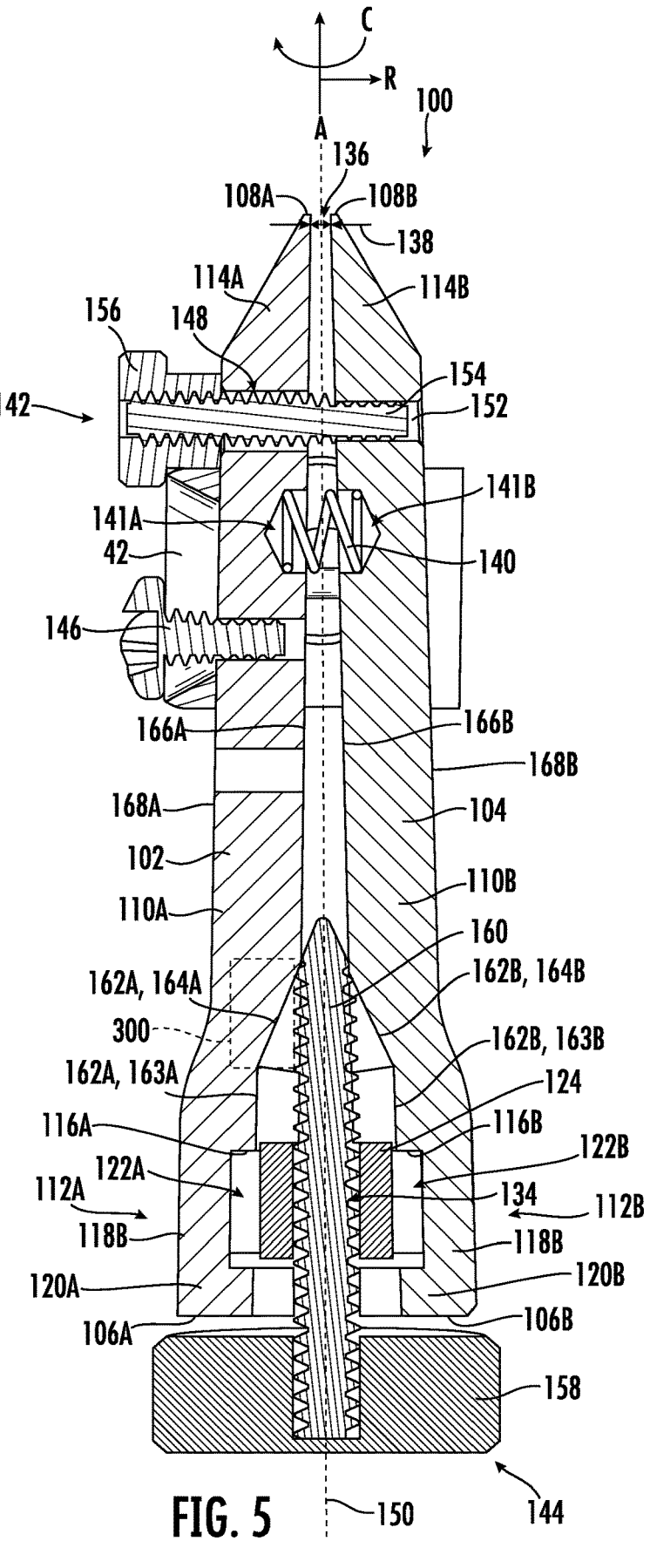
FIG. 5 illustrates a cross-sectional view of a jaws assembly in accordance with embodiments of the present disclosure.

FIGS. 3 through 5 illustrate various views of the jaws assembly 100 in accordance with embodiments of the present disclosure. Specifically, FIG. 3 illustrates a perspective view of the jaws assembly 100, FIG. 4 illustrates an exploded view of the jaws assembly 100, and FIG. 5 illustrates a cross-sectional view of the jaws assembly 100.

The shaft mounting flange 42 may define a slot 44, and a fastener (e.g., the third fastener 146 as discussed below) may extend through the slot 44 into one of the first jaw member 102 or the second jaw member 104 to couple the jaws assembly 100 to the shaft 20. The fastener 146 may be adjusted within the slot 44 to move the jaws assembly 100 closer to, or further away from, the centerline axis 21 (FIG. 1). This adjustment may be necessary to ensure the shank of the fishhook is aligned with the centerline axis 21.

As shown, the jaws assembly 100 may extend from a forward end 101 to an aft end 103. Particularly, the jaws assembly may extend along an axial centerline 150 (FIG. 5) from the forward end 101 to the aft end 103. The jaws assembly 100 may be longest along the axial centerline 150. The jaws assembly 100 may define an axial direction A that extends along the axial centerline 150 from the forward end 101 to the aft end 103, a radial direction R that is perpendicular to the axial direction A, and a circumferential direction C extending about the axial centerline 150. As used herein, the terms "forward" and "aft" are used with respect to the axial direction A, with "forward" being closer to the forward end 101 or base and "aft" being closer to the aft end 103 or tip.

The jaws assembly 100 may include the first jaw member 102 and the second jaw member 104, which may each extend (e.g., axially) from a base 106A, 106B to a tip 108A, 108B. The axial centerline 150 of the jaws assembly 100 may be defined between the first jaw member 102 and the second jaw member 104. The base 106A may be the forwardmost portion of the first jaw member 102, and the base 106B may be the forwardmost portion of the second jaw member 104. The tip 108A may be the aftmost portion of the first jaw member 102, and the tip 108B may be the aftmost portion of the second jaw member 104.

The first jaw member 102 and the second jaw member 104 may each include a main body 110A, 110B, a flange portion 112A, 112B extending from a forward end of the main body 110A, 110B, and a tapering portion 114A, 114B extending from an aft end of the main body 110A, 110B. For example, as shown, the main body 110A, 110B may extend from a forward face 116A, 116B to the tip 108A, 108B. The flange portion 112A, 112B may extend from the forward face 116A, 116B. Particularly, the flange portion 112A, 112B may include an axial segment 118A, 118B and an end wall segment 120A, 120B, which extends generally perpendicularly to the axial segment 118A, 118B and defines the base 106A, 106B. The forward face 116A and the flange portion 112A of the first jaw member 102 may define a cavity 122A, and the forward face 116B and the flange portion 112B of the second jaw member 104 may define a cavity 122B.

The jaws assembly 100 may further include a nut 124 disposed within the cavity 122A of the first jaw member 102 and the cavity 122B of the second jaw member 104. The nut 124 may be disposed axially between the forward face 116A, 116B and the end wall segment 120A, 120B of the first jaw member 102 and the second jaw member 104. Particularly, the nut 124 may have a body 126 with a first pair of tabs 128 extending from a first side of the body 126 on either side of the axial segment 118A of the first jaw member 102. Further, the nut 124 may further include a second pair of tabs 132 extending from the body 126 on either side of the axial segment 118B of the second jaw member 104. In many embodiments, the nut 124 may define a threaded hole 134, which may be disposed in the body 126 and aligned with the axial centerline 150 of the jaws assembly 100.

In exemplary embodiments, the first jaw member 102 and the second jaw member may be at least partially spaced apart from one another (e.g., radially spaced apart from one another), such that a gap 136 is defined between the tip 108A of the first jaw member 102 and the tip 108B of the second jaw member 104 (e.g., at the aft end 103 of the jaws assembly 100). The gap 136 may be defined between the tips 108A, 108B and may be adjustable, such that a width 138 of the gap 136 may expand or contract such that the jaw members 102, 104 pinch or clamp onto a fishhook as desired.

In exemplary embodiments, the jaws assembly 100 may further include a first fastener 142, a second fastener 144, a third fastener 146, and a mechanical spring 140. the jaws assembly 100 of the fly tying vise 10 may further include a mechanical spring 140 that extends between (and contacts) the first jaw member 102 and the second jaw member 104. The mechanical spring 140 may be housed within a first spring cavity 141A in the first jaw member 102 and a second spring cavity 141B in the second jaw member 104. In many embodiments, as shown, the mechanical spring 140 may be a helical spring that is oriented generally perpendicularly to the axial centerline 150 of the jaws assembly 100, such that a radial expansive spring force is exerted on the first jaw member 102 and the second jaw member 104 when the mechanical spring 140 is compressed. The mechanical spring 140 may be forward of the first fastener 142 and aft of the second fastener 144. That is, the mechanical spring 140 may be forward of the first fastener 142 (i.e., forward of the fulcrum or pivot point for the jaws assembly), such that the expansion force exerted by the mechanical spring acts to close the gap 136 at the aft end 103 (or keep the gap as closed as is permitted by the first fastener 142 and the second fastener 144).

The first fastener 142 may couple the first jaw member 102 to the second jaw member 104. The first fastener 142 may extend through a hole 148 in the first jaw member 102 and threadably couples to a threaded hole 152 in the second jaw member 104. The hole 148 may be non-threaded, such that the first jaw member 102 is movable along the first fastener 142. That is, the first jaw member 102 may be movable relative to the first fastener 142 and relative to the second jaw member 104 by sliding along, and/or pivoting on, the first fastener 142. The first fastener 142 may be oriented generally perpendicularly to the axial centerline 150 (i.e., oriented generally radially). The first fastener 142 may include a screw 154 and a thumb nut 156 threadably coupled to the screw 154. The screw may extend through the hole 148 and threadably couple to the threaded hole 152. The thumb nut 156 may be disposed in contact with an exterior surface of the first jaw member 102.

The second fastener 144 may extend between the first jaw member 102 and the second jaw member 104 at the base 106A, 106B of the first jaw member 102 and the second jaw member 104. For example, in exemplary embodiments, the second fastener 144 may extends generally parallel to the axial centerline 150. In many embodiments, the second fastener 144 may be aligned with the axial centerline 150 such that the second fastener 144 is coaxial therewith. The second fastener 144 may include a handle 158 and a screw 160 coupled to the handle 158. The handle 158 may be disposed forward of the base 106A, 106B of the first jaw member 102 and the second jaw member 104. The screw 160 may extend from, and threadably couple to, the handle 158. Particularly, the screw 160 may extend generally axially from the handle 158, through the base 106A, 106B, through the threaded hole 134 in the nut 124, and contact an interior surface of the first jaw member 102 and the second jaw member 104. That is, the second fastener 144 (e.g., the screw 160 of the second fastener 144) is couplable (e.g., threadably) to the threaded hole 134 of the nut 124.

In exemplary embodiments, the second fastener 144 may be removably contactable with the first jaw member 102 and the second jaw member 104 to adjust the width 138 of the gap 136 at the aft end 103. For example, rotation of the handle 158 moves the screw 160 axially forward or aft (via the threaded connection between the screw 160 and the nut 124), thereby causing the screw 160 to act as a wedge that forces the first jaw member 102 and the second jaw member 104 radially apart forward of the mechanical spring 140 and the first fastener 142 (which defines the pivot point or fulcrum of the jaws assembly). This causes the width 138 of the gap 136 to be adjusted as desired for clamping or pinching the jaw members 102, 104 together onto a fishhook or other article.

The first jaw member 102 and the second jaw member 104 may each define an interior surface (or radially inward surface) 166A, 166B and an exterior surface (or radially outward surface) 168A, 168B. In exemplary embodiments, at least one of the first jaw member 102 and the second jaw member 104 may define a recessed surface 162A, 162B having a main portion 163A, 163B and tapering portion 164A, 164B. Particularly, as shown, both the first jaw member 102 and the second jaw member 104 may include the recessed surface 162A, 162B. The recessed surface 162A, 162B may be radially inward from (or radially recessed from) the interior surface 166A, 166B. The main portion 163A, 163B of the recessed surface 162A, 162B may extend generally axially from the forward face 116A, 116B to the tapering portion 164A, 164B. The tapering portion 164A, 164B may converge radially inward as the tapering portion 164A, 164B extends axially from the main portion 163A, 163B. In many embodiments, the second fastener 144 is removably contactable with the tapering portion 168A, 168B of the recessed surface 162A, 162B of the first jaw member 102 and the second jaw member 104 to adjust the width 138 of the gap 136.

Figure 6:
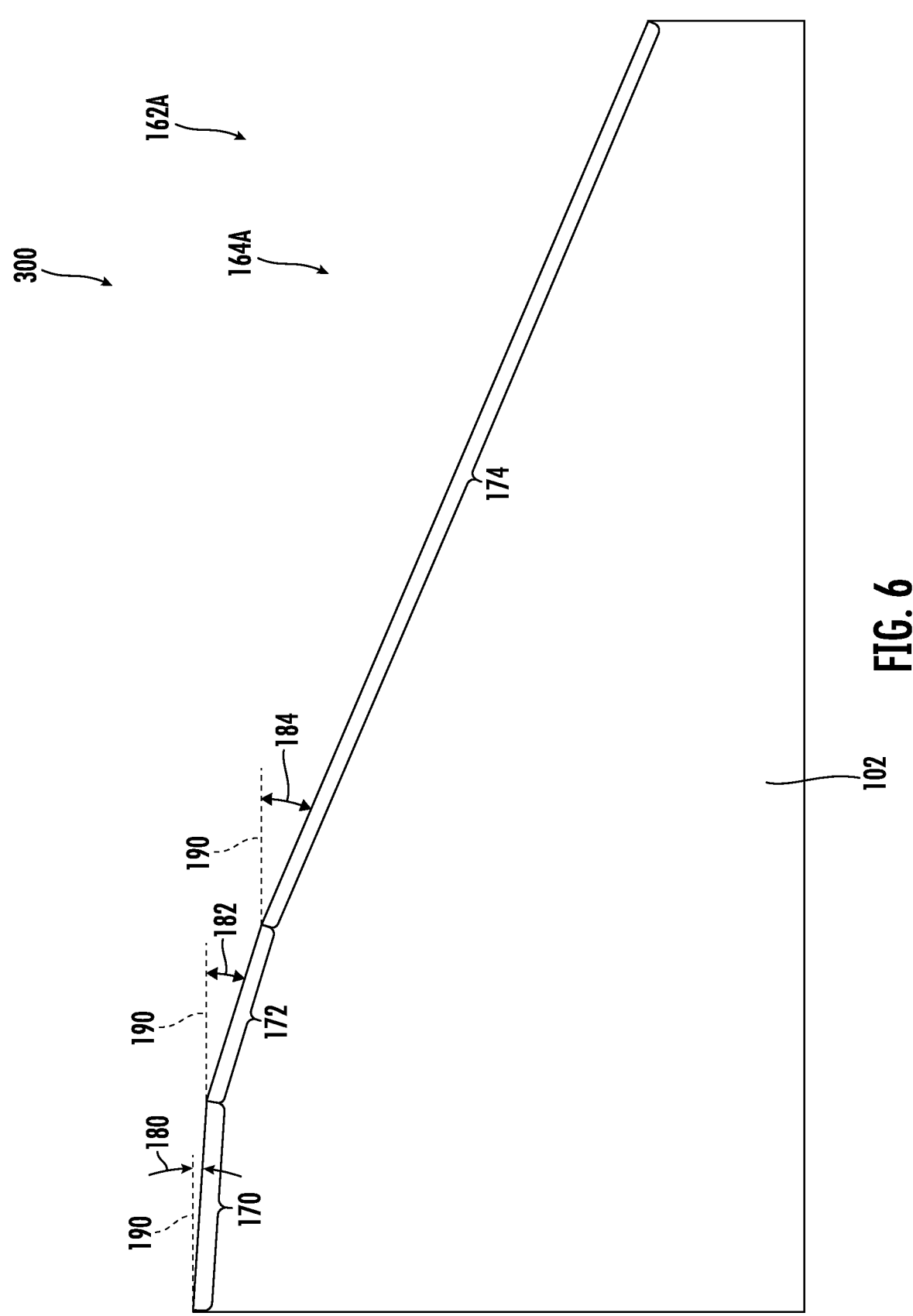
FIG. 6 is an enlarged view of a detail of the jaws assembly shown in FIG. 5 in accordance with embodiments of the present disclosure.

A detail 300 of the tapering portion 164A of the recessed surface 162A of the first jaw member 102 of the jaws assembly 100 is outlined by a dashed box in FIG. 5, and this detail 300 is enlarged and shown in FIG. 6. While FIG. 6 illustrates an enlarged view of the tapering portion 164A of the first jaw member 102, it should be appreciated that the tapering portion 164B of the second jaw member 104 also includes the features shown in FIG. 6 and described below. As shown, the tapering portion 164 of the recessed surface 162 may extend between a forward end 171 (which may be connected to the main portion 163 as shown in FIG. 5) and an aft end 177. The tapering portion 164 may include a first segment 170, a second segment 172, and a third segment 174. Each of the first segment 170, the second segment 172, and the third segment 174 may be angled differently relative to an axial reference line 190.

The axial reference line 190 may be parallel to the axial centerline 150 of the jaws assembly 100 shown in FIG. 5. A first angle 180 may be defined between the first segment 170 and the axial reference line 190, a second angle 182 may be defined between the second segment 172 and the axial reference line 190, and a third angle 184 may be defined between the third segment 174 and the axial reference line 190. Each of the angles 180, 182, 184 may be different than one another. For example, the first angle 180 may be the smallest of the angles 180, 182, 184, the third angle 184 may be the largest of the angles 180, 182, 184, and the second angle 182 may be between the first angle 180 and the second angle 184.

In exemplary implementations, the second segment 172 (or the contact surface) may be the only segment of the tapering portion 164 that the screw 160 contacts during insertion into the recessed surface 162. This advantageously allows the screw to act as a wedge to force the jaw members 102, 104 apart forward of the fulcrum while minimizing contact area between the screw 160 and the jaw members 102, 104, thereby minimizing friction.

Figure 7:
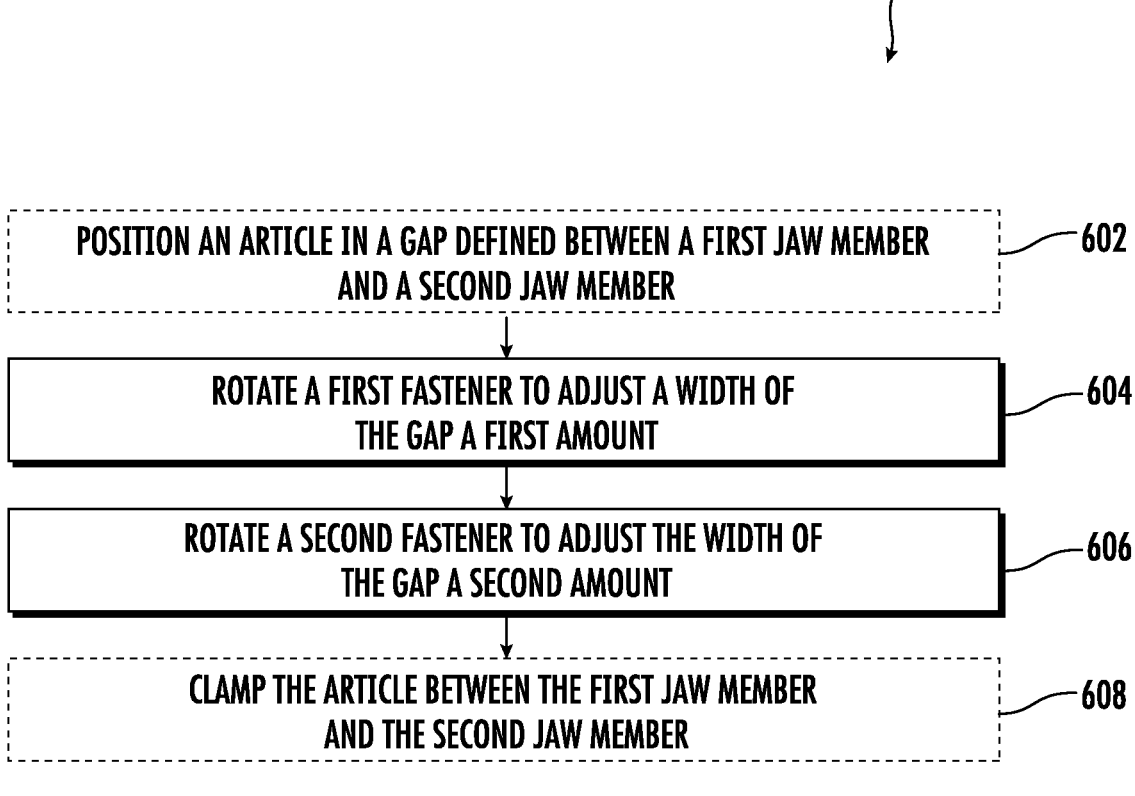
FIG. 7 is a flow chart of a method of operating a jaws assembly in accordance with embodiments of the present disclosure.

Referring now to FIG. 7, a flow diagram of one embodiment of a method 600 of operating a jaws assembly is illustrated in accordance with embodiments of the present subject matter. In general, the method 600 will be described herein with reference to the fly tying vise 10 and the jaws assembly 100 described above with reference to FIGS. 1 through 5. However, it will be appreciated by those of ordinary skill in the art that the disclosed method 600 may generally be utilized with any suitable fly tying vise and/or may be utilized in connection with a system having any other suitable system configuration. In addition, although FIG. 7 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown, the method 600 may include optional steps as indicated by dashed boxes. In some implementations, the method 600 may include, at (602), an initial step of positioning an article in a gap defined between a first jaw member and a second jaw member. In exemplary implementations, the article may be a fishhook used for creating a fishing fly. In exemplary implementations, the method 600 may include at (604) rotating a first fastener to adjust a width of the gap a first amount. the first fastener may couple the first jaw member to the second jaw member. Rotating the first fastener at (604) may cause the first jaw member and the second jaw member to move closer together, thereby reducing the width of the gap a first amount.

In exemplary implementations, the method may further include at (606) rotating a second fastener to adjust the width of the gap a second amount. Rotating at (606) may include rotating the second fastener in the circumferential direction to translate the second fastener axially into contact with both the first jaw member and the second jaw member, thereby pushing the jaw members apart forward of a fulcrum and forcing the jaw members together at the tips of the jaw members. In some embodiments, the method 600 may further include at (608) clamping the article between the first jaw member and the second jaw member (e.g., at the tips of the jaw members). In some embodiments, the jaws assembly may be coupled to a shaft that rotates about a centerline axis. In such embodiments, the method may further include applying a force to a finger pin attached to the shaft to rotate the jaws assembly and the article (e.g., a fish hook) about the centerline axis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A jaws assembly for a fly tying vise, the jaws assembly comprising: a first jaw member and a second jaw member each extending from a base to a tip, the first jaw member and the second jaw member at least partially spaced apart from one another such that a gap is defined between the tip of the first jaw member and the tip of the second jaw member; a first fastener coupling the first jaw member to the second jaw member; and a second fastener extending between the first jaw member and the second jaw member at the base of the first jaw member and the second jaw member, the second fastener removably contactable with the first jaw member and the second jaw member to adjust a width of the gap.

The jaws assembly as in any preceding clause, wherein at least one of the first jaw member and the second jaw member define a recessed surface having a tapering portion, and wherein the second fastener is removably contactable with the tapering portion of the recessed surface to adjust the width of the gap.

The jaws assembly as in any preceding clause, wherein the jaws assembly defines an axial centerline extending between a forward end and an aft end of the jaws assembly and between the first jaw member and the second jaw member, wherein the first fastener extends generally perpendicularly to the axial centerline, and wherein the second fastener extends generally parallel to the axial centerline.

The jaws assembly as in any preceding clause, wherein the first jaw member and the second jaw member each comprise a main body and a flange portion extending from the main body.

The jaws assembly as in any preceding clause, further comprising a nut disposed between the flange portion of the first jaw member and the flange portion of the second jaw member.

The jaws assembly as in any preceding clause, wherein the nut defines a threaded hole, and wherein the second fastener is couplable to the threaded hole of the nut.

The jaws assembly as in any preceding clause, further comprising a mechanical spring extending between the first jaw member and the second jaw member, the mechanical spring disposed forward of the first fastener and aft of the second fastener.

The jaws assembly as in any preceding clause, wherein the first fastener extends through a hole in the first jaw member and threadably couples to a threaded hole in the second jaw member.

The jaws assembly as in any preceding clause, wherein the second fastener includes a handle and a screw coupled to the handle, the handle disposed forward of the base.

The jaws assembly as in any preceding clause, further comprising a shaft mounting flange that defines a slot, wherein a third fastener extends through the slot to removably couple to one of the first jaw member and the second jaw member.

A fly tying vise comprising: a base; a housing; a stem extending from the base to the housing; a shaft extending from the housing; a shaft mounting flange coupled to the shaft; and a jaws assembly coupled to the shaft mounting flange, the jaws assembly comprising: a first jaw member and a second jaw member each extending from a base to a tip, the first jaw member and the second jaw member at least partially spaced apart from one another such that a gap is defined between the tip of the first jaw member and the tip of the second jaw member; a first fastener coupling the first jaw member to the second jaw member; and a second fastener extending between the first jaw member and the second jaw member at the base of the first jaw member and the second jaw member, the second fastener removably contactable with the first jaw member and the second jaw member to adjust a width of the gap.

The fly tying vise as in any preceding clause, wherein at least one of the first jaw member and the second jaw member define a recessed surface having a tapering portion, and wherein the second fastener is removably contactable with the tapering portion of the recessed surface to adjust the width of the gap.

The fly tying vise as in any preceding clause, wherein the jaws assembly defines an axial centerline extending between a forward end and an aft end of the jaws assembly and between the first jaw member and the second jaw member, wherein the first fastener extends generally perpendicularly to the axial centerline, and wherein the second fastener extends generally parallel to the axial centerline.

The fly tying vise as in any preceding clause, wherein the first jaw member and the second jaw member each comprise a main body and a flange portion extending from the main body.

The fly tying vise as in any preceding clause, further comprising a nut disposed between the flange portion of the first jaw member and the flange portion of the second jaw member.

The fly tying vise as in any preceding clause, wherein the nut defines a threaded hole, and wherein the second fastener is couplable to the threaded hole of the nut.

The fly tying vise as in any preceding clause, further comprising a mechanical spring extending between the first jaw member and the second jaw member, the mechanical spring disposed forward of the first fastener and aft of the second fastener.

The fly tying vise as in any preceding clause, wherein the first fastener extends through a hole in the first jaw member and threadably couples to a threaded hole in the second jaw member.

The fly tying vise as in any preceding clause, wherein the second fastener includes a handle and a screw coupled to the handle, the handle disposed forward of the base.

A method of operating a jaws assembly, the jaws assembly comprising a first jaw member and a second jaw member each extending from a base to a tip, the first jaw member and the second jaw member at least partially spaced apart from one another such that a gap is defined between the tip of the first jaw member and the tip of the second jaw member, the method comprising: rotating a first fastener to adjust a width of the gap a first amount, the first fastener coupling the first jaw member to the second jaw member; and rotating a second fastener to adjust the width of the gap a second amount.

What is claimed is:

1. A jaws assembly for a fly tying vise, the jaws assembly comprising:

a first jaw member and a second jaw member each extending from a base to a tip, the first jaw member and the second jaw member at least partially spaced apart from one another such that a gap is defined between the tip of the first jaw member and the tip of the second jaw member, wherein at least one of the first jaw member and the second jaw member define a recessed surface having a tapering portion, and wherein the tapering portion includes a first segment, a second segment, and a third segment each angled differently relative to an axial centerline of the jaws assembly;

a first fastener coupling the first jaw member to the second jaw member; and a second fastener extending between the first jaw member and the second jaw member at the base of the first jaw member and the second jaw member, the second fastener removably contactable with the second segment of the tapering portion to adjust a width of the gap.

2. The jaws assembly as in claim 1, wherein the jaws assembly defines the axial centerline extending between a forward end and an aft end of the jaws assembly and between the first jaw member and the second jaw member, wherein the first fastener extends generally perpendicularly to the axial centerline, and wherein the second fastener extends generally parallel to the axial centerline.

3. The jaws assembly as in claim 1, wherein the first jaw member and the second jaw member each comprise a main body and a flange portion extending from the main body.

4. The jaws assembly as in claim 3, further comprising a nut disposed between the flange portion of the first jaw member and the flange portion of the second jaw member.

5. The jaws assembly as in claim 4, wherein the nut defines a threaded hole, and wherein the second fastener is couplable to the threaded hole of the nut.

6. The jaws assembly as in claim 1, further comprising a mechanical spring extending between the first jaw member and the second jaw member, the mechanical spring disposed forward of the first fastener and aft of the second fastener.

7. The jaws assembly as in claim 1, wherein the first fastener extends through a hole in the first jaw member and threadably couples to a threaded hole in the second jaw member.

8. The jaws assembly as in claim 1, wherein the second fastener includes a handle and a screw coupled to the handle, the handle disposed forward of the base.

9. The jaws assembly as in claim 1, further comprising a shaft mounting flange that defines a slot, wherein a third fastener extends through the slot to removably couple to one of the first jaw member and the second jaw member.

10. The jaws assembly as in claim 1, wherein the second fastener is a multi-threaded fastener.

11. A fly tying vise comprising:

a base;

a housing;

a stem extending from the base to the housing;

a shaft extending from the housing;

a shaft mounting flange coupled to the shaft; and a jaws assembly coupled to the shaft mounting flange, the jaws assembly comprising:

a first jaw member and a second jaw member each extending from a base to a tip, the first jaw member and the second jaw member at least partially spaced apart from one another such that a gap is defined between the tip of the first jaw member and the tip of the second jaw member, wherein at least one of the first jaw member and the second jaw member define a recessed surface having a tapering portion, and wherein the tapering portion includes a first segment, a second segment, and a third segment each angled differently relative to an axial centerline of the jaws assembly;

a first fastener coupling the first jaw member to the second jaw member; and a second fastener extending between the first jaw member and the second jaw member at the base of the first jaw member and the second jaw member, the second fastener removably contactable with the second segment of the tapering portion to adjust a width of the gap.

12. The fly tying vise as in claim 11, wherein the jaws assembly defines the axial centerline extending between a forward end and an aft end of the jaws assembly and between the first jaw member and the second jaw member, wherein the first fastener extends generally perpendicularly to the axial centerline, and wherein the second fastener extends generally parallel to the axial centerline.

13. The fly tying vise as in claim 11, wherein the first jaw member and the second jaw member each comprise a main body and a flange portion extending from the main body.

14. The fly tying vise as in claim 13, further comprising a nut disposed between the flange portion of the first jaw member and the flange portion of the second jaw member.

15. The fly tying vise as in claim 14, wherein the nut defines a threaded hole, and wherein the second fastener is couplable to the threaded hole of the nut.

16. The fly tying vise as in claim 11, further comprising a mechanical spring extending between the first jaw member and the second jaw member, the mechanical spring disposed forward of the first fastener and aft of the second fastener.

17. The fly tying vise as in claim 11, wherein the first fastener extends through a hole in the first jaw member and threadably couples to a threaded hole in the second jaw member.

18. The fly tying vise as in claim 11, wherein the second fastener includes a handle and a screw coupled to the handle, the handle disposed forward of the base.

19. A method of operating a jaws assembly, the jaws assembly comprising a first jaw member and a second jaw member each extending from a base to a tip, the first jaw member and the second jaw member at least partially spaced apart from one another such that a gap is defined between the tip of the first jaw member and the tip of the second jaw member, wherein at least one of the first jaw member and the second jaw member define a recessed surface having a tapering portion, and wherein the tapering portion includes a first segment, a second segment, and a third segment each angled differently relative to an axial centerline of the jaws assembly, the method comprising:

rotating a first fastener to adjust a width of the gap a first amount, the first fastener coupling the first jaw member to the second jaw member; and rotating a second fastener to contact the second segment of the tapering portion to adjust the width of the gap a second amount.

\* \* \* \* \*